April 11, 1933.  J. F. G. CHOBERT  1,903,695
ADJUSTABLE TURNBUCKLE
Filed April 17, 1930

J. F. G. Chobert
INVENTOR

By Mares & Clar
Attys.

Patented Apr. 11, 1933

1,903,695

UNITED STATES PATENT OFFICE

JACQUES FRANCOIS GABRIEL CHOBERT, OF ST.-ETIENNE, FRANCE

ADJUSTABLE TURNBUCKLE

Application filed April 17, 1930, Serial No. 445,149, and in France April 29, 1929.

The object of the present invention is to provide improvements in adjustable turn-buckles employed in the various attachment and securing devices such as airplanes stays, motor car rodding, brake controls operating through rigid rods or cables, stays for lifting apparatus, etc.

The particular object of the invention is to provide by very simple means easily adjustable turn-buckles which can work either under tension or compression.

A further object of the invention is to prevent the screwed rod of the turn-buckle from turning with respect to the body of the turn-buckle.

Adjustable turn-buckles improved according to the invention present features which will appear from the following description and particularly from the claims annexed to this description.

An adjustable turn-buckle according to the preferred form of the invention is shown in the accompanying drawing, in which.

Figure 1:
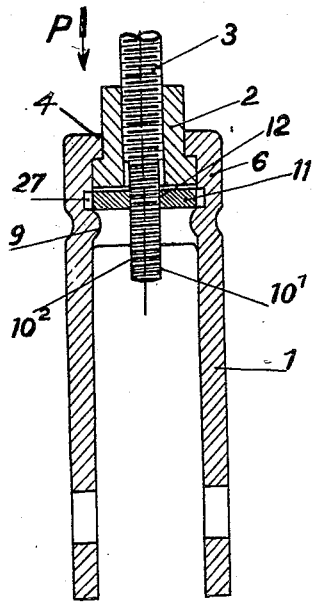
Figure 1 is a vertical section through a turn-buckle according to the invention.
Figure 2:
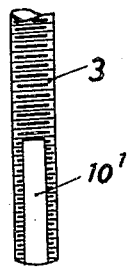
Figure 2 is an axial section through the screwed rod which is shown dismounted.

The turn-buckle shown in Figure 1 comprises a turn-buckle body 1 in which a nut 2 is inserted in the usual manner, this nut being engaged in the orifice 4 of the turn-buckle and having the function of regulating the rod 3. In order to prevent the rod 3 from turning in the barrel nut 2, it is sufficient to form one or more flats $10^1$, $10^2$ (Figure 2) on the screw threaded rod 3, which are tangential to the nut of the thread. The most practical number of flats is 2 because such a number does not weaken the strength of the screw threaded rod in any way, and it enables a good bearing to be obtained for preventing the rotation of this rod 3.

Figure 4:
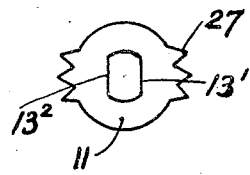
Figure 4 is a plan view of this brake plate.

The turn buckle shown in Figure 1 comprises a brake device for the rod 3. For this purpose a washer or plate 11 (Figure 4) is inserted within the turn-buckle, this washer having at its centre an orifice 12 with two flats $13^1$, $13^2$ corresponding to the flats $10^1$, $10^2$ on the screw threaded rod 3. Then a circular crimping 9 is formed beneath the washer all round the cap 6 of the turn-buckle, so as to retain the washer 11 and at the same time prevent the nut 2 from moving back when it is acted upon by a pressure from the rod 3 in the direction of the arrow P.

This arrangement thus permits the turn-buckle to work well under compression and tension.

Figure 3:
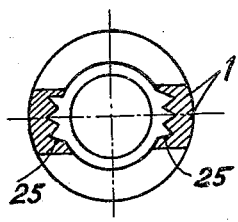
Figure 3 shows a turn-buckle comprising a brake-forming plate and viewed from below.

But there may be a danger of the brake plate 11 turning in the body of the turn-buckle as a consequence of the force exerted by the flats 10 of the screw threaded rod 3. In order to prevent this disadvantage teeth 25 are machined or forged in the body of the turn buckle (Figure 3) and are obtained by passing a former through the turn buckle or by any other method of machining.

In addition, the toothed washer 11 comprises teeth 27 (Figure 4) corresponding to those formed in the body of the turn-buckle. The washer is placed in the body of the turn-buckle, the teeth 27 engaged with the teeth 25 in the body of the turn-buckle and then the inner edge of the cap 6 of the turn-buckle is crimped over the washer 11 which can then no longer turn because it is retained by the teeth.

In this way a turn-buckle is obtained which is easily adjustable and is adapted to work equally well under compression and under tension, and the screw threaded rod of which cannot turn with respect to the body of the turn-buckle.

In the example above described, it has been assumed that the adjustable turn-buckle comprises a barrel nut; the devices which retain the nut in the body of the turn-buckle are obviously applicable to adjustable turn-buckles whatever be the type of regulating nut employed.

What I claim is:

1. A turn buckle comprising a body, an adjustable member mounted in one end thereof, said body having crimps formed therein, and means between the crimps and adjusting member to prevent sliding movement of the adjusting member with respect to the body.

2. A turn buckle comprising a body having an adjustable member carried thereby, a rod threaded in said member, a brake device fixed with the body and constantly engaged with the adjusting member, cooperative means carried by the rod and brake devices to prevent relative rotation of the brake device and rod, and means carried by the body engageable with the brake device to prevent sliding movement of the brake device and adjusting member.

3. A turn buckle having an adjusting member engaged in one end thereof, a rod threaded in the adjusting member, said rod having flat faces thereon, a plate having a central orifice, the wall of which being provided with flat faces adapted to engage the similar faces of the rod to prevent rotation of the rod with respect to the plate, said plate being constantly engaged with the adjusting member to prevent sliding thereof in the body, means for securing the plate to the body, and means for holding the plate against rotation with respect to the body.

4. A turn buckle comprising a body, an adjusting member carried thereby, a plate having blocking means thereon for engaging similar means on the body to prevent rotation of the plate with respect to the body, said plate being constantly engaged with the adjusting member to prevent sliding thereof in the body, a rod threaded in the adjusting member and extending through the plate, cooperative means carried by the rod and plate to prevent relative rotation of the rod and plate, and means carried by the body having permanent intimate engagement with the plate to prevent sliding movement of the plate.

5. A turn buckle comprising a body having an adjusting member carried thereby, said body having teeth formed thereon, a plate having teeth carried thereby adapted to mesh with the teeth of the body to prevent rotation of said plate relative to the body, said plate having a central orifice therein, the wall of which being provided with flat faces, a rod threaded in the adjusting member and having flat faces engageable with the similar faces of the plate, said plate being constantly engaged with the adjusting member to prevent sliding thereof in the body, means carried by the body for permanent intimate engagement with the plate to retain the same against sliding movement, and to prevent sliding movement of the plate with respect to the body, as and for the purpose set forth.

6. A turn buckle comprising a body having an adjusting member in one end thereof, a rod threaded in the member, a plate fixed with the body, cooperative means carried by the plate and rod to prevent relative rotation thereof, said body having crimps formed therein for intimate engagement with the plate to prevent sliding movement thereof and of the adjusting member, as and for the purpose set forth.

In testimony whereof I have signed this specification.

JACQUES FRANCOIS GABRIEL CHOBERT.